(12) United States Patent
Fabre (10) Patent No.: US 7,543,049 B2
(45) Date of Patent: Jun. 2, 2009

(54) SYSTEMS AND METHODS FOR EFFICIENT DISCOVERY OF A COMPUTING DEVICE ON A NETWORK

(75) Inventor: Byron Scott Fabre, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1170 days.

(21) Appl. No.: 10/937,723

(22) Filed: Sep. 9, 2004

(65) Prior Publication Data

US 2006/0069762 A1    Mar. 30, 2006

(51) Int. Cl.
*G06F 15/177* (2006.01)
(52) U.S. Cl. .................. 709/222; 709/220; 709/223
(58) Field of Classification Search .................. None
See application file for complete search history.

(56) References Cited

U.S. PATENT DOCUMENTS

| | | | | |
|---|---|---|---|---|
| 2002/0161879 | A1* | 10/2002 | Richard | 709/223 |
| 2003/0005100 | A1  | 1/2003  | Barnard et al. | |
| 2003/0112765 | A1  | 6/2003  | Gaspard et al. | |
| 2003/0163583 | A1  | 8/2003  | Tarr | |
| 2003/0225883 | A1* | 12/2003 | Greaves et al. | 709/224 |
| 2006/0182034 | A1* | 8/2006  | Klinker et al. | 370/238 |

FOREIGN PATENT DOCUMENTS

| | | |
|---|---|---|
| CA | 2 330 709 | 8/2001 |
| EP | 1 124 400 | 8/2001 |
| EP | 1 271 895 | 1/2003 |
| JP | 2001-258060 | 9/2001 |
| JP | 2003-158552 | 5/2003 |

OTHER PUBLICATIONS

K. White, RFC 2925 Definitions of Managed Objects for Remote Ping, Traceroute, and Lookup Operations, Sep. 2000, IBM Corp., RFC 2925, pp. 1-77.*

* cited by examiner

*Primary Examiner*—David E England
(74) *Attorney, Agent, or Firm*—Austin Rapp & Hardman (57) ABSTRACT

Systems and methods for discovering a device on a computer network are disclosed. An exemplary method involves providing key data to be sent with an initiation message. The initiation message is sent by an origination device on a computer network to an undiscovered destination device on the computer network. The initiation message includes the key data. The undiscovered destination device includes an electronic or computing device that the origination device has not sent electronic communications to. The initiation message is received by the undiscovered destination device. The key data is obtained by the undiscovered destination device from the initiation message. Key reply data is provided that is based on the key data. An initiation reply is sent by the undiscovered destination device to the origination device on the computer network. The initiation reply includes the key reply data.

3 Claims, 5 Drawing Sheets

SYSTEMS AND METHODS FOR EFFICIENT DISCOVERY OF A COMPUTING DEVICE ON A NETWORK

TECHNICAL FIELD

The present invention relates generally to electronic communications on a computer network. More specifically, the present invention relates to systems and methods for more efficient discovery of a computing or electronic device on a computer network.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, printers, scanners, copiers, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

Computing devices may be used to communicate with, monitor or control many different systems, resources, products, etc. With the growth of computer networks, the Internet and the World Wide Web, computing devices are increasingly connected to computer networks so that they can be in electronic communication with other devices (e.g., other computers, printers, scanners, copiers, network storage devices, etc.). As the use of computer networks continues to grow, there will be an increased need for more efficient communications techniques. Benefits may be realized if systems and methods for more efficient communications over a computer network were provided.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A method for discovering a device on a computer network is disclosed. An exemplary method involves providing key data to be sent with an initiation message. The initiation message is sent by an origination device on a computer network to an undiscovered destination device on the computer network. The initiation message includes the key data. The undiscovered destination device includes an electronic or computing device that the origination device has not sent electronic communications to. The initiation message is received by the undiscovered destination device. The key data is obtained by the undiscovered destination device from the initiation message. Key reply data is provided that is based on the key data. An initiation reply is sent by the undiscovered destination device to the origination device on the computer network. The initiation reply includes the key reply data.

In one embodiment, the initiation message may comprise an Internet Control Message Protocol (ICMP) echo request message, otherwise known as a ping. The ICMP echo request message may use a variable packet size option to embed the key data.

In an embodiment, the initiation reply may comprise an ICMP echo reply message. The ICMP echo reply message may embed the key reply data. A key reply data size may be the same as a key data size. The key reply data may be different from the key data.

The key data may comprise a Simple Network Management Protocol (SNMP) message. The SNMP message may comprise one or more SNMP get strings.

A computing device configured for discovering a device on a computer network is also disclosed. The computing device includes a processor and memory in electronic communication with the processor. A communications interface in electronic communication with a computer network is also included. The computing device also includes executable instructions executable by the processor. The executable instructions are configured to implement a method for discovering a device on a computer network. An initiation message from an origination device on the computer network is received. The initiation message includes key data. The origination device has not yet discovered the computing device on the computer network. The key data is obtained from the initiation message. Key reply data based on the key data is provided. An initiation reply is sent to the origination device on the computer network. The initiation reply includes the key reply data.

A computer-readable medium for storing program data, wherein the program data comprises executable instructions for implementing a method for discovering a device on a computer network, is also disclosed. An initiation message from an origination device on the computer network is received. The initiation message includes key data. The origination device has not yet discovered the computing device on the computer network. The key data is obtained from the initiation message. Key reply data based on the key data is provided. An initiation reply is sent to the origination device on the computer network. The initiation reply includes the key reply data.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention. In fact any use of the ICMP variable data area for passing information is claimed as an embodiment.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

Typically when an application wishes to find devices on a network which satisfy certain requirements it does so inefficiently and sometimes slowly. Current network device discovery algorithms are multi-part requiring multiple protocols and multiple communications with each protocol. The resulting time delays are problematic and in certain cases may be unreliable and inefficient.

For instance some products use Internet Control Message Protocol (ICMP) to explore the existence of a device and Simple Network Management Protocol (SNMP) is used to collect Management Information Base (MIB) information about the device. If a device responds to an ICMP ping packet but fails to respond in a timely manner to the following SNMP get packets, a series of retries and timeouts are used to ensure delivery of the replies to the SNMP get packets. Another series of protocols may be used, but the net result is typically the same: delays and retransmission overhead. The delays are one issue that may be addressed through retransmission.

Many current systems for discovery and information gathering on network devices are cumbersome and problematic. The present embodiments address both the problematic reliability of time outs and network traffic loading by reducing the protocol sequences to just one.

Typically sets of protocols were used to first find a network device and then to query details of the network device. A typical sequence would be to ping a device then follow with either an SNMP query (or sets of queries) or the use of Service Location Protocol (SLP) where multicasts are used to find devices. Discovering the desired devices in a large heavily populated network may take an extended period of time.

An example of code which can demonstrate the problem is shown below. Notice the call to "snmpget" which generates multiple SNMP packets on the ether wire:

```perl
#!/usr/bin/perl
print "Hello, World...\n";
#Yahoo: this works from Production Net PC to a Test Net printer
use BER;
use SNMP_util;
use SNMP_Session;
$HOST = "172.29.236.49:161";
$OID_sysContact = ".1.3.6.1.2.1.1.4.0";
$OID_sysName = ".1.3.6.1.2.1.1.5.0";
$OID_sysLocation = ".1.3.6.1.2.1.1.6.0";
($value)=
&snmpget("public\@$HOST","$OID_sysContact","$OID_sysName","$OID_sysLocation");
if ($value) {
    print "Returned Value = $value:\n";
```

```
}
else { warn "No response from host :$HOST:\n"; }
#KNOWN GOOD !!
$setresponse = snmpset("private\@172.29.236.49",
                                        "sysContact", "string", "bozo",
                                        "sysName", "string", "moi",
                                        "sysLocation", "string", "here");
    if ($setresponse) {
        print "SET Responded\n";
    }
    else { warn "No response from host : $HOST:\n"; }
    ($value)                                                                      =
&snmpget("public\@$HOST","$OID_sysContact","$OID_sysName","$OID_sysLocation");
    if ($value) {
        print "Returned Value = $value:\n";
    }
    else { warn "No response from host :$HOST:\n"; }
```

The code above represents a typical SNMP protocol exchange after a successful ICMP ping. While this exchange would be acceptable for normal device interaction it is inefficient and problematic for device discovery.

The present embodiments propose to improve efficiency of the process of finding network devices of interest. This is accomplished by combining multiple operations typically involved in the discovery conversation with the networked device into fewer operations. By simplifying and combining the initial contact of a network device with the data gathering step the process is made both more reliable and faster. In one embodiment, a single ICMP protocol exchange is used to accomplish this.

Figure 1:
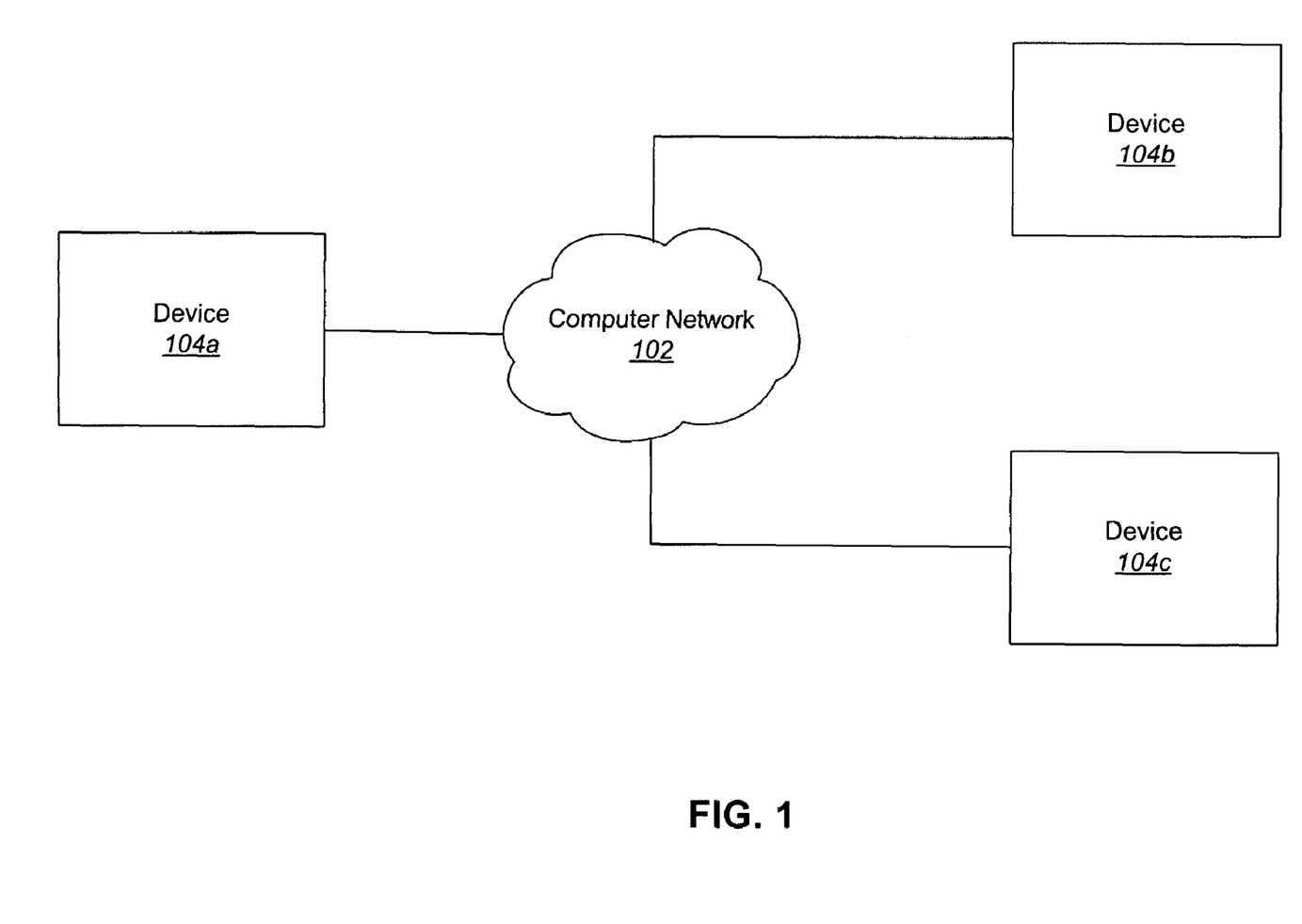
FIG. 1 is a general block diagram illustrating a computer network with several electronic devices in electronic communication with the computer network.

FIG. 1 is a general block diagram illustrating a computer network 102 with several electronic devices 104a-c in electronic communication with the computer network 102. The embodiments herein deal with the process of an electronic device 104 initially discovering one or more other electronic devices 104.

Figure 2:
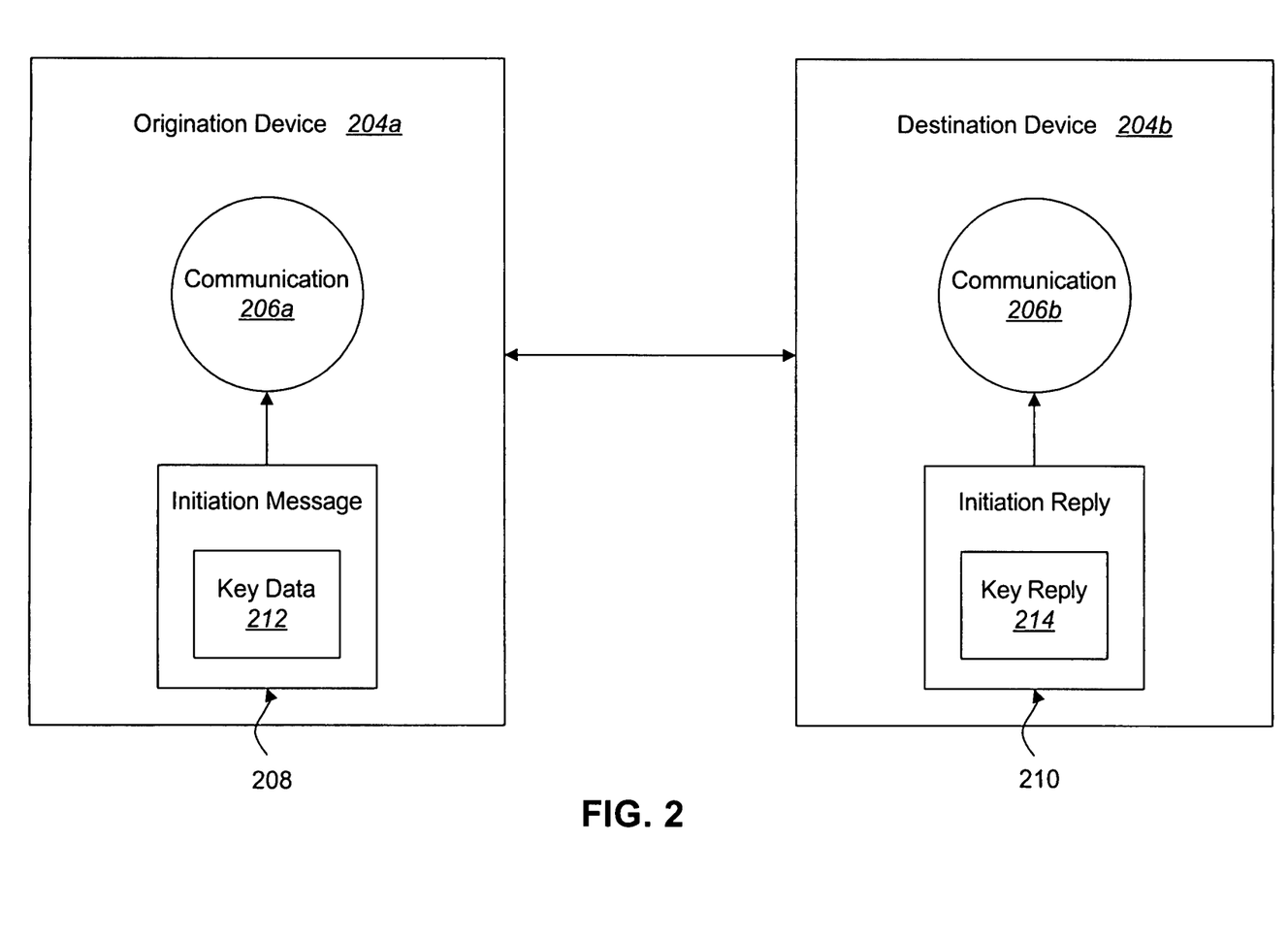
FIG. 2 is a block diagram illustrating one device discovering another device.

FIG. 2 is a block diagram illustrating one device 204a discovering another device 204b. An origination device 204a initially is not aware of the destination device 204b. This may be the situation when one device is connected to a computer network and has not yet established communication with another device on the network. The origination device 204a includes a communication process 206a that handles electronic communication over a computer network 102. The communication process 206a of the original device 204a uses an initiation message 208 to first discover another electronic device 204b. The initiation message 208 includes key data 212. The key data 212 is data that is embedded with the initiation message 208 that otherwise would be sent in later messages. By including the key data 212 with the initiation message 208 the communication is achieved more efficiently.

The destination device 204b includes a communication process 206b that handles electronic communication over a computer network 102. The communication process 206b of the destination device 204b uses an initiation reply 210 to first reply to the initiation message 208 from the origination device 204a. The initiation reply 210 includes a key reply 214 that is sent in response to the initiation message 208. The key reply 214 is data that is embedded with the initiation reply 210 that otherwise would be sent in later messages.

If the destination device 204b is aware of the capability of the origination device 204a to send an initiation message 208 then it will typically include a key reply 214. If a destination device 204b is not configured for the more efficient communications disclosed herein, then it would not have a key reply 214. As a result, the data that could be packed into the initial discovery messages would be transmitted in later messages, thus taking longer.

Figure 3:
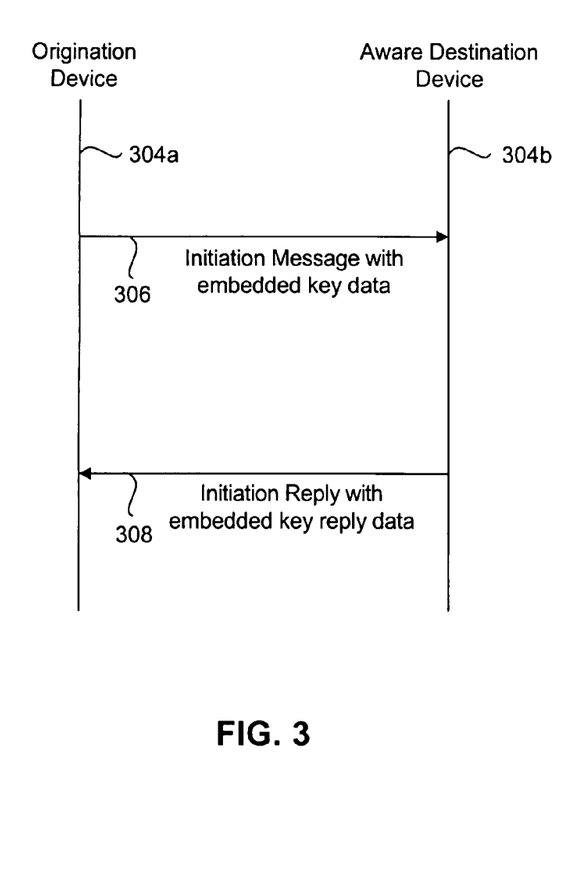
FIG. 3 is a flow diagram illustrating the communications between the origination device and an aware destination device.

FIG. 3 is a flow diagram illustrating the communications between the origination device 304a and an aware destination device 304b. Before the first message 306 is sent, the two devices 304a, 304b have not established electronic communications with one another. The origination device 304a sends an initiation message 306 with the embedded key data 212. Once the aware destination device 304b receives the message 306, it will process the key data 212 and then send an initiation reply 308 with embedded key reply data 214.

Figure 4:
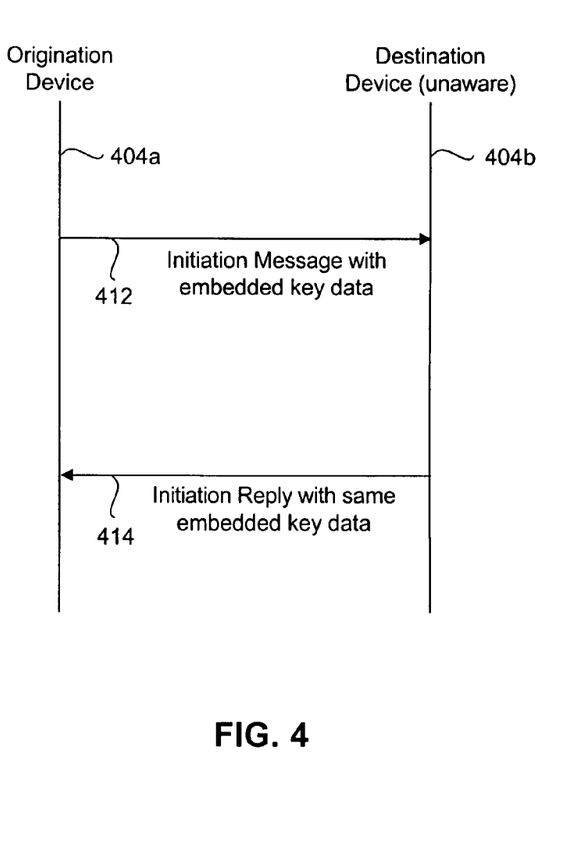
FIG. 4 is a flow diagram illustrating the communications between the origination device and a destination device that is unaware of the more efficient means for discovering network devices.

FIG. 4 is a flow diagram illustrating the communications between the origination device 404a and a destination device 404b that is unaware of the more efficient means for discovering network devices (i.e., it has not been programmed or configured with the capability to process the key data and reply with key reply data). The origination device 404a sends an initiation message 412 with the embedded key data 212. The origination device 404a sends the initiation message 412 with the embedded key data 212 because it does not know at that time whether the destination device 404b is aware or unaware. When the destination device 404b receives the message it 404b will reply with a standard initiation reply message 414 with the same embedded key data. Because this destination device 404b is unaware it does not have the key reply 214 to reply with or it does not know that it can reply with the key reply 214.

Figure 5:
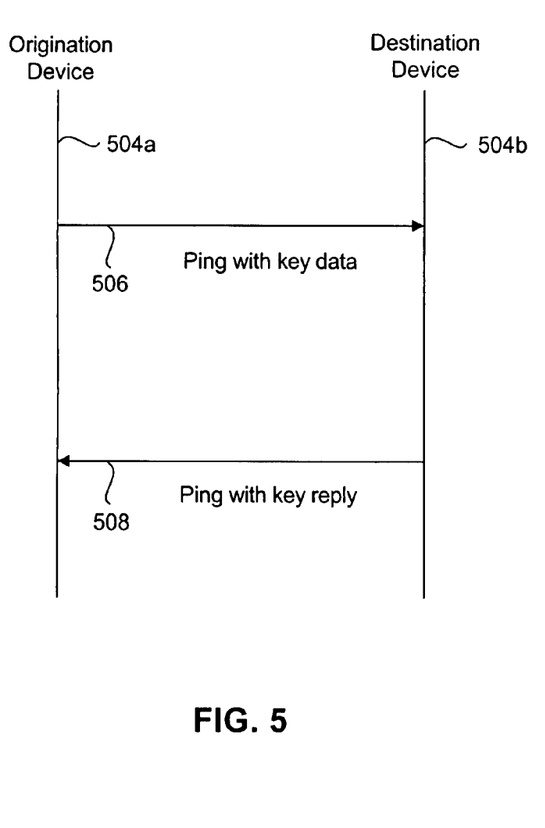
FIG. 5 is a flow diagram illustrating the use of a ping with the present embodiments.

In one embodiment the initiation message 208 is a ping. FIG. 5 is a flow diagram illustrating the use of a ping with the present embodiments. The origination device 504a sends a ping 506 with the embedded key data 212. Once the aware destination device 504b receives the message 506, it will process the key data 212 and send a reply 508 to the ping with embedded key reply data 214.

Figure 6:
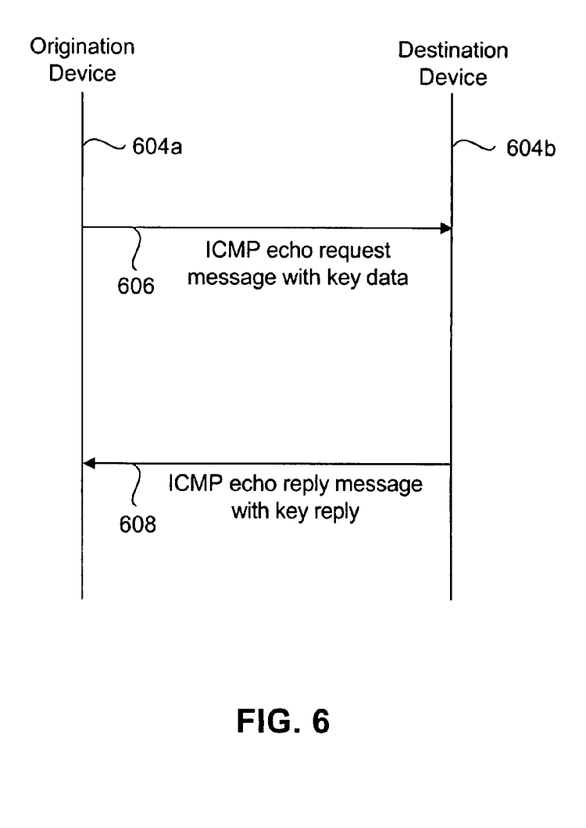
FIG. 6 is a flow diagram illustrating a specific embodiment where an ICMP echo request message is used.

FIG. 6 is a flow diagram illustrating a specific embodiment where an ICMP echo request message is used. The ICMP echo request message is otherwise known as a ping. FIG. 6 is similar to FIG. 5 with the use of different terminology that may be used by those skilled in the art. The origination device 604a sends an ICMP echo request message 606 with the embedded key data 212 to the aware destination device 604b. The aware destination device 604b replies with an ICMP echo reply message 608 with embedded key reply data 214. This is different than a standard ICMP echo reply message because normally the data received in an echo request message must be returned in the echo reply message.

The key data 212 may comprise various kinds of data. For example, the key data 212 may include, but is not limited to, an SNMP message, binary encoded data, encrypted data, ASCII text, etc.

One possible use of the present systems and methods is as shown below. The implementation of the current embodiment includes two parts. One part is on the origination device 204a and the other is on the destination device 204b. Each part is represented within the communication processes 206a, 206b of FIG. 2.

The communication process 206a of the origination device 204a may use the following for the first message:

ping -l 1024<device IP address>

The 1024 bytes of data may include a series of SNMP get <OID> statements.

The destination device 204b, if programmed or configured with the present systems and methods, will respond to the packet size definition with the requested responses. The data that will be sent back as the key reply data 214 may already be buffered and ready to transmit.

One aspect of the present embodiments is to carry out two (or more) operations in a single operation. In the aforementioned embodiment this is accomplished by the use of the "packetsize" option which already exists as a part of the ICMP ping protocol. Since this embodiment uses ICMP ping to contain embedded SNMP get strings, then the ICMP reply will carry back from the target host (the destination device 204b) a payload of data (the key reply 214). In this embodiment, the payload of data may include among other things the SNMP host ID object, the host status, and other configuration details.

The default use of ICMP—ping does not contain a data component on the send or receive. The embodiments that use ICMP utilize the ICMP option of variable packet size on the source side (the origination device 204a), to transmit a proprietary structure.

The following data structure is an example of the content of the data that may be included in the ICMP ping packet:

$OID_sysContact=".1.3.6.1.2.1.1.4.0";
$OID_sysName=".1.3.6.1.2.1.1.5.0";
$OID_sysLocation=".1.3.6.1.2.1.1.6.0";

This structure comprises the key data 212 that is transmitted to the destination device 204b as part of the ICMP ping. This structure acts as a key to a properly configured destination network device 204b. A properly configured destination network device 204b is an "aware" network device. An aware device is configured to read the key data 212 sent with the ICMP ping and is also configured to respond as outlined herein (thereby not responding in the typical fashion by sending the same data back). The aware network device 204b responds with the same size packet as the sending device 204a. However, the response structure of the key reply 214 includes data such that the destination device 204b is now not only found but data about the destination device 204b is sent to the origination device 204a thereby avoiding the need to send the data about the destination device 204b later. The content of the data structure of the key data and/or the key reply 214 includes, but is not limited to, any of:

1. SNMP get/reply of any MIB object(s)
2. binary encoded data
3. encrypted
4. ASCII Text An example of a key reply 214 comprising an SNMP response data block may look like this:

Object identifier 1: 1.3.6.1.2.1.1.4.0
Value: OCTET STRING: bozo
Object identifier 2: 1.3.6.1.2.1.1.5.0
Value: OCTET STRING: moi
Object identifier 3: 1.3.6.1.2.1.1.6.0
Value: OCTET STRING: here The protocol conversation is reduced to a single exchange process (one initial message and one reply) so secondary status updates do not have multilevel timeouts nor retransmission issues. Essentially the SNMP get data and receive data are "tunneled" through using an ICMP ping.

Another example of the kind of content for the data that may be included in the ICMP ping packet is:

GET/copier_xml.html

And the reply ICMP ping might contain:

---

HTTP/1.1 200 OK..Server: Rapid Logic/1.1.. MIME-version: 1. 0..Date: Sat Jul6 11:42:44 1996 GMT..Content-Type: text/html.. Transfer-Encoding: chunked..Extend-sharp-setting-status: 0....1E..<?xml version="1.0" encoding="..A..iso-8859-1..6F." ?>....<!-- File name: copier_xml.html -->....<!-- this copier info is provided by the MFP-->..<COPIER name="..E..LeopardAR-275..6.." sn="..A..1650009800..8.." type=".. C..SHARP AR-275..B.." netscan="..4..open..409..">.... <!-- NOTE: The markups under HTTPPROFILE contain values that are coupled -->.. !-- tothe web pages named in the "url" attributes. ->. ..<HTTPPROFILE>. ...<ADD action="post" url="scan_desktop_profile. html" submit="button1">.....<PROFILENAME name="deskprofilename" >.....<PROFILESORT name="deskinitial" />.....<PROFILEPATH name="processdir" />. ....<HOSTIP name="deskaddress" />.....<HOSTPORT ame="deskportnum" />....</ADD>. ...<UPDATE action="post" url="scan_desktop_nst_edit.html" submit="button1">..... <PROFILENAME name="nstdeskprofilename" />.....<PROFILESORT name="deskinitial" />.....<PROFILEPATH name="processdir" />.....<HOSTIP name="deskaddress" />.....<HOSTPORT name="deskportnum" />.... </UPDATE>....<DELETE action="post" url="delete.html" submit="B1">.....<PROFILENAME name="profname" />.....<BUTTONDEL name="B1" value="Yes" />... .</DELETE>....<QUERY action="get" url="get_all_profiles.xml" />. ..</HTTPPROFILE>......<HOMEPAGE>index.html</HOMEPAGE> .....<...p..SETUP>.... <DNS>.....<_1SERVER>..E..172.29. 236.203..1A..</_1SERVER>.....<_2SERVER>..1C..</_2SERVER> .....<DOMAINNAME>..A..slasqa.com..33..</DOMAINNAME> ....</DNS>......<EMAIL>.....<_1SERVER>.. 1A..</_1SERVER>.....<_2SERVER>..19..</_2SERVER>.. ...<TIMEOUT>..2..30..1D..</TIMEOUT>......<REPLYADDRESS> ..40.. </REPLYADDRESS>. ...</EMAIL>..... .<LOCALE>.....<TIMEZONE bias="">..3D..(GMT) Greenwich Mean Time Dublin, Edinburgh, Lisbon, London..52..</TIMEZONE>.....<LANGUAGE id=""></LANGUAGE>....</LOCALE>......<SCAN>... ..<TOEMAIL>..3.. yes..16..</TOEMAIL>.....<TOFTP>. .3..yes..18..</TOFTP>......<TODESKTOP>..3..yes..1F..</TODESKTOP> . ....<EMAILSUBJECT>..21..Scanned mage from Leopard AR-275..32..</EMAILSUBJECT>.. ..</SCAN>...</SETUP>..</COPIER>

---

Figure 7:
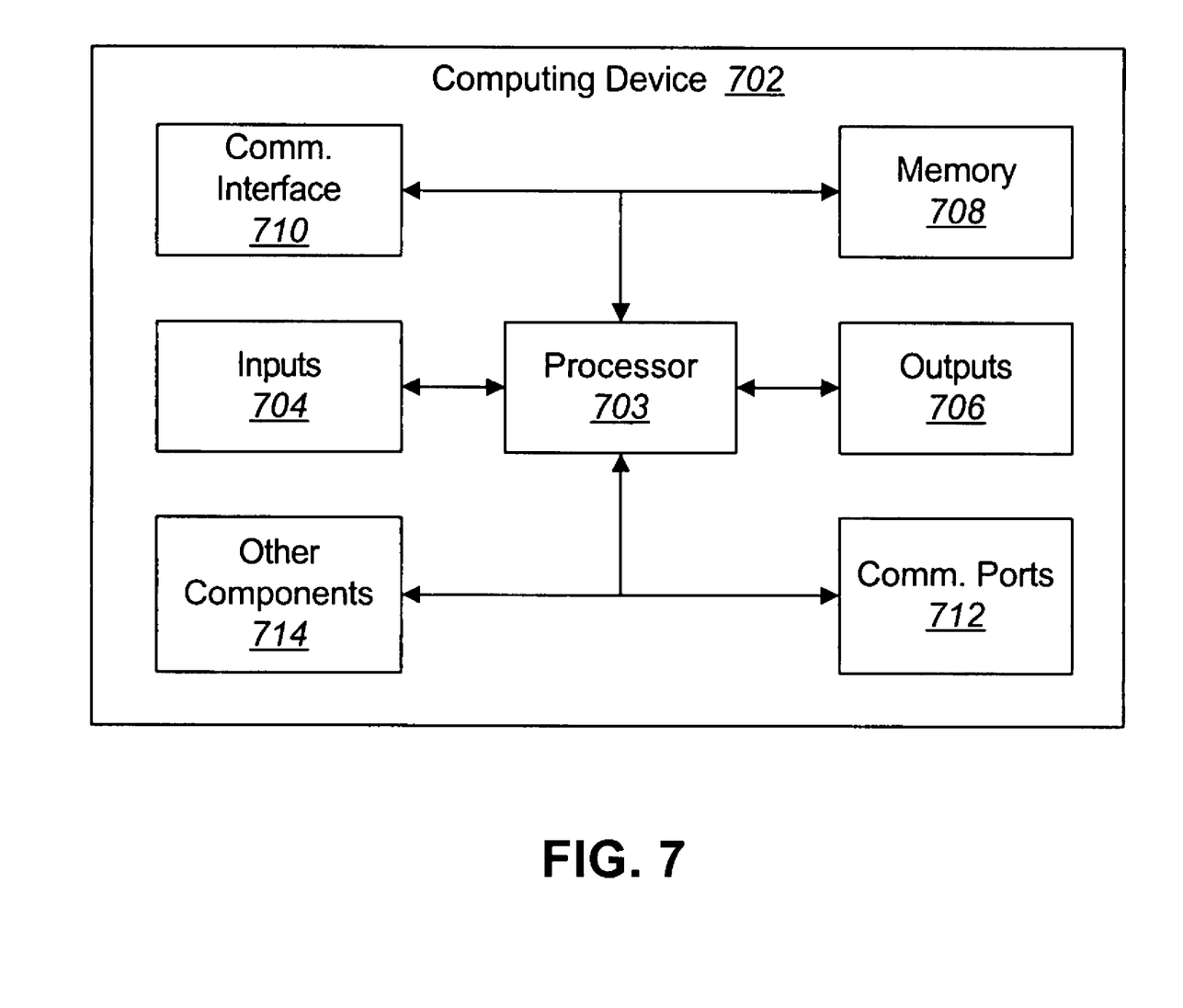
FIG. 7 is a block diagram illustrating the major hardware components typically utilized with embodiments herein.

FIG. 7 is a block diagram illustrating the major hardware components typically utilized with embodiments herein. The systems and methods disclosed may be used with an electronic and/or computing device 702. Computing devices 702 are known in the art and are commercially available. The major hardware components typically utilized in a computing device 702 are illustrated in FIG. 7. A computing device 702 typically includes a processor 703 in electronic communication with input components or devices 704 and/or output components or devices 706. The processor 703 is operably connected to input 704 and/or output devices 706 capable of electronic communication with the processor 703, or, in other words, to devices capable of input and/or output in the form of an electrical signal. Embodiments of devices 702 may include the inputs 704, outputs 706 and the processor 703 within the same physical structure or in separate housings or structures. The processor 703 controls the operation of the device 702 and may be embodied as a microprocessor, a microcontroller, a digital signal processor (DSP) or other device known in the art. The processor 703 typically performs logical and arithmetic operations based on program instructions stored within the memory 708.

The electronic device 702 may also include memory 708. The memory 708 may be a separate component from the processor 703, or it may be on-board memory 708 included in the same part as the processor 703. For example, microcontrollers often include a certain amount of on-board memory. As used herein, the term "memory" 708 is broadly defined as any electronic component capable of storing electronic information, and may be embodied as read only memory (ROM), random access memory (RAM), magnetic disk storage media, optical storage media, flash memory devices in RAM, on-board memory included with the processor 703, EPROM memory, EEPROM memory, registers, etc. The memory 708 typically stores program instructions and other types of data. The program instructions may be executed by the processor 703 to implement some or all of the methods disclosed herein.

The processor 703 is also in electronic communication with a communication interface 710. The communication interface 710 may be used for communications with other devices 702. Thus, the communication interfaces 710 of the various devices 702 may be designed to communicate with each other to send signals or messages between the computing devices 702. The communication interfaces 710 may be based on wired communication technology, wireless communication technology, or both. Examples of different types of communication interfaces 710 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The device 702 typically also includes one or more input devices 704 and one or more output devices 706. Examples of different kinds of input devices 704 include a keyboard, mouse, microphone, remote control device, button, joystick, trackball, touchpad, lightpen, etc. Examples of different kinds of output devices 706 include a speaker, printer, etc. One specific type of output device which is typically included in a computer system is a display device (not shown).

The computing device 702 may also include other communication ports 712. In addition, other components 714 may also be included in the electronic device 702.

Many kinds of different devices may be used with embodiments herein. The computing device 702 may be a one-chip computer, such as a microcontroller, a one-board type of computer, such as a controller, a typical desktop computer, such as an IBM-PC compatible, a printer, a scanner, a copier, a Personal Digital Assistant (PDA), a Unix-based workstation, etc. Accordingly, the block diagram of FIG. 7 is only meant to illustrate typical components of a computing device 702 and is not meant to limit the scope of embodiments disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for discovering a device on a computer network, the method comprising:

providing key data to be sent with an initiation message, wherein the initiation message comprises an Internet Control Message Protocol (ICMP) echo request message, and wherein the ICMP echo request message uses a variable packet size option to embed the key data;

sending the initiation message by an origination device on a computer network to an undiscovered destination device on the computer network, wherein the initiation message includes the key data, and wherein the undiscovered destination device comprises an electronic or computing device that the origination device has not sent electronic communications to;

receiving the initiation message by the undiscovered destination device;

obtaining the key data by the undiscovered destination device from the initiation message and providing key reply data based on the key data; and sending an initiation reply by the undiscovered device to the origination device on the computer network, wherein the initiation reply includes the key reply data, wherein the initiation reply comprises an ICMP echo reply message, wherein the ICMP echo reply message embeds the key reply data, wherein a key reply data size is the same as a key data size, wherein the key reply data is different from the key data, wherein the key data comprises a Simple Network Management Protocol (SNMP) message, and wherein the SNMP message comprises one or more SNMP get strings.

2. A computing device configured for discovering a device on a computer network, the computing device comprising:

a processor;

memory in electronic communication with the processor;

a communications interface in electronic communication with a computer network; and executable instructions stored on the memory and executable by the processor, when executed, the executable instructions causes the processor to perform a method comprising:

receiving an initiation message from an origination device on the computer network, wherein the initiation message comprises an Internet Control Message Protocol (ICMP) echo request message, wherein the initiation message includes key data, and wherein the origination device has not yet discovered the computing device on the computer network;

obtaining the key data from the initiation message, wherein the key data comprises a Simple Network Management Protocol (SNMP) message, and wherein the SNMP message comprises one or more SNMP get strings;

providing key reply data based on the key data; and sending an initiation reply to the origination device on the computer network, wherein the initiation reply comprises an ICMP echo reply message, wherein the initiation reply includes the key reply data, wherein the ICMP echo reply message embeds the key reply data, wherein a key reply data size is the same as a key data size, and wherein the key reply data is different from the key data.

3. A computer-readable medium having stored thereon, program data, wherein the program data comprises executable instructions, which when executed, performs a method for discovering a device on a computer network, the method comprising:

receiving an initiation message from an origination device on the computer network, wherein the initiation message comprises an Internet Control Message Protocol (ICMP) echo request message, wherein the initiation message includes key data, and wherein the origination device has not yet discovered the computing device on the computer network;

obtaining the key data from the initiation message, wherein the key data comprises a Simple Network Management Protocol (SNMP) message, and wherein the SNMP message comprises on or more SNMP get strings;

providing key reply data based on the key data; and sending an initiation reply to the origination device on the computer network, wherein the initiation reply includes the key reply data, wherein the initiation reply comprises an ICMP echo reply message, wherein the ICMP echo reply message embeds the key reply data, wherein a key reply data size is the same as a key data size, and wherein the key reply data is different from the key data.

* * * * *

UNITED STATES PATENT AND TRADEMARK OFFICE
CERTIFICATE OF CORRECTION

PATENT NO. : 7,543,049 B2  Page 1 of 1
APPLICATION NO. : 10/937723
DATED : June 2, 2009
INVENTOR(S) : Byron Scott Fabre It is certified that error appears in the above-identified patent and that said Letters Patent is hereby corrected as shown below:

In Column 11, line 18 please replace "undiscovered device" with -- undiscovered destination device --.
In Column 11, line 37 please replace "causes" with -- cause --.
In Column 12, lines 17-18 please replace "thereon, program" with -- thereon program --.
In Column 12, line 19 please replace "performs" with -- perform --.
In Column 12, line 32 please replace "on" with -- one --.

Signed and Sealed this

Nineteenth Day of January, 2010

David J. Kappos
*Director of the United States Patent and Trademark Office*